US008290920B2

(12) United States Patent
Mahajan et al.

(10) Patent No.: US 8,290,920 B2
(45) Date of Patent: *Oct. 16, 2012

(54) SYSTEM AND METHOD FOR REMOTE UPDATES

(75) Inventors: Amitt Mahajan, San Francisco, CA (US); Sifang Lu, Concord, CA (US); Luke Thomas Rajlich, San Francisco, CA (US); Timothy D. Wang, Berkeley, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/878,904

(22) Filed: Sep. 9, 2010

(65) Prior Publication Data

US 2011/0320401 A1     Dec. 29, 2011

Related U.S. Application Data

(60) Provisional application No. 61/247,492, filed on Sep. 30, 2009.

(51) Int. Cl.
*G06F 17/30* (2006.01)
(52) U.S. Cl. ................ 707/703; 463/1; 700/91
(58) Field of Classification Search .............. 707/703; 700/91; 463/1
See application file for complete search history.

(56) References Cited

U.S. PATENT DOCUMENTS

| 5,707,286 A * | 1/1998 | Carlson ........................... 463/16 |
| 2002/0160833 A1 * | 10/2002 | Lloyd et al. ...................... 463/29 |
| 2005/0026697 A1 * | 2/2005 | Balahura et al. ................. 463/42 |
| 2010/0087241 A1 * | 4/2010 | Nguyen et al. .................. 463/17 |
| 2010/0197384 A1 * | 8/2010 | Wright et al. ................... 463/26 |

OTHER PUBLICATIONS

Beskow et al., Latency Reduction in Massively Multi-player Online Games by Partial Migration of Game State, 2007.*
Chan et al., Hydra A Massively-Multiplayer Peer-to-Peer Architecture for the Game Developer, NetGames '07 Sep. 19-20, 2007.*
Glinka et al., High-Level Development of Multiserver Online Games, Int'l J. of Comp. Games Tech., 2008, Article 327387.*
Kletsch et al., Towards an AJAX-based Game Engine, Future Play '08 Proceedings of the 2008 Conference on Future Play.*
Kolonaiari et al., A Recall-Based Cluster Formation Game in Peer-to-Peer Systems, Proceedings of the VLDB Endowment, Voume 2 Issue 1, Aug. 2009.*
Min et al., A Load Balancing Algorithm for a Distributed Multimedia Game Server Architecture, 1999 IEEE International Conference on Multimedia Computing and Systems—vol. 2.*

(Continued)

*Primary Examiner* — William Spieler
(74) *Attorney, Agent, or Firm* — Martine Penilla Group, LLP

(57) ABSTRACT

In one embodiment, accessing, using a computing device, a batch file comprising a plurality of events generated by a remote game client application executing an instance of a computer-implemented game; accessing, in response to the batch file, a game state data object associated with the instance of the computer-implemented game, wherein the game state data object includes one or more game state parameters formatted as serialized unstructured data; parsing the game state data object to identify the one or more game state parameters; processing the plurality of events in the batch file against game logic to update one or more of the game state parameters; re-serializing the one or more game state parameters into an updated game state data object; and storing the game state data object in a memory cache.

12 Claims, 6 Drawing Sheets

OTHER PUBLICATIONS

Mitchell et al., Six in the City, Proceeding NetGames '03, May 2003.*

Wagner et al., Muddleware for Prototyping Mixed Reality Multiuser Games, Muddleware for Prototyping Mixed Reality Multiuser Games, Virtual Reality Conference, 2007. VR '07. IEEE, Mar. 2007.*

White et al., Database Research Opportunities in Computer Games, Newsletter ACM SIGMOD Record vol. 36 Issue 3, Sep. 2007.*

White et al., Scaling Games to Epic Proportions, 2007 SIGMOD Games.*

Walker, Sharing Game Data, Mar. 25, 2008, accessed Mar. 16, 2012.*

* cited by examiner

SYSTEM AND METHOD FOR REMOTE UPDATES

RELATED APPLICATION

The application claims benefit under 35 U.S.C. §119(e) of U.S. Provisional Patent Application No. 61/247,492, entitled "System and Method for Remote Updates", filed 30 Sep. 2009, which is hereby incorporated by reference in its entirety and for all purposes.

TECHNICAL FIELD

The present disclosure generally relates to synchronizing application state data between one or more client applications and a backend system that persistently stores the application state data.

BACKGROUND

A client-server computing or networking environment provides a distributed application architecture that partitions tasks or work loads between service providers, often referred to as "servers", and service requesters, often referred to as "clients". Typically, the clients and the servers operate over a computer network on separate hardware. Individual clients and servers may perform different tasks but in a coordinated manner so that together they may accomplish specific objectives or results that are desirable to both the clients and the servers. As high-speed network connections become more prevalent, an ever-increasing number of computer-implemented applications are being run on remote server systems at locations different from those where clients controlling the applications are located. While an application is running, data relevant to the application may need to be shared between the clients and the servers involved with the application from time to time, which may be achieved by transmitting the data between the individual clients and servers over a computer network. For example, suppose an application is running on a client device associated with a user but the application data are stored in a database managed by a server system. Each time the user makes a change to an application datum at the client device, the client device needs to send an update notice to the server system so that the server system may update the corresponding application datum stored in the database accordingly. However, despite the increased bandwidth connecting the servers and the clients, it can still be undesirably slow to transmit application data between a server and a client to update to the remote server, which in turn will update an application state in a database, each time a user makes a change the application on a client computer.

The problem described in the above example is further multiplied by environments in which large numbers of users are all making many application updates at the same time, which causes many client devices to send update notices to the same server system at the same time. This particular problem is typified by multi-player online games that are run on a remote game server or a social network server. Receiving, processing, and saving each application update as the updates are received is not scalable when a server is servicing the many users of a multi-player online game.

SUMMARY

The present disclosure generally relates to updating data stored in memory and more specifically relates to receiving updates for the data from remote computing systems, generating serialized binary objects for the updates, and updating the data stored in the memory using the serialized binary objects.

In particular embodiments, accessing, using a computing device, a batch file comprising a plurality of events generated by a remote game client application executing an instance of a computer-implemented game; accessing, in response to the batch file, a game state data object associated with the instance of the computer-implemented game, wherein the game state data object includes one or more game state parameters formatted as serialized unstructured data; parsing the game state data object to identify the one or more game state parameters; processing the plurality of events in the batch file against game logic to update one or more of the game state parameters; re-serializing the one or more game state parameters into an updated game state data object; and storing the game state data object in a memory cache.

These and other features, aspects, and advantages of the disclosure are described in more detail below in the detailed description and in conjunction with the following figures.

DESCRIPTION OF EXAMPLE EMBODIMENT(S)

Figure 1:
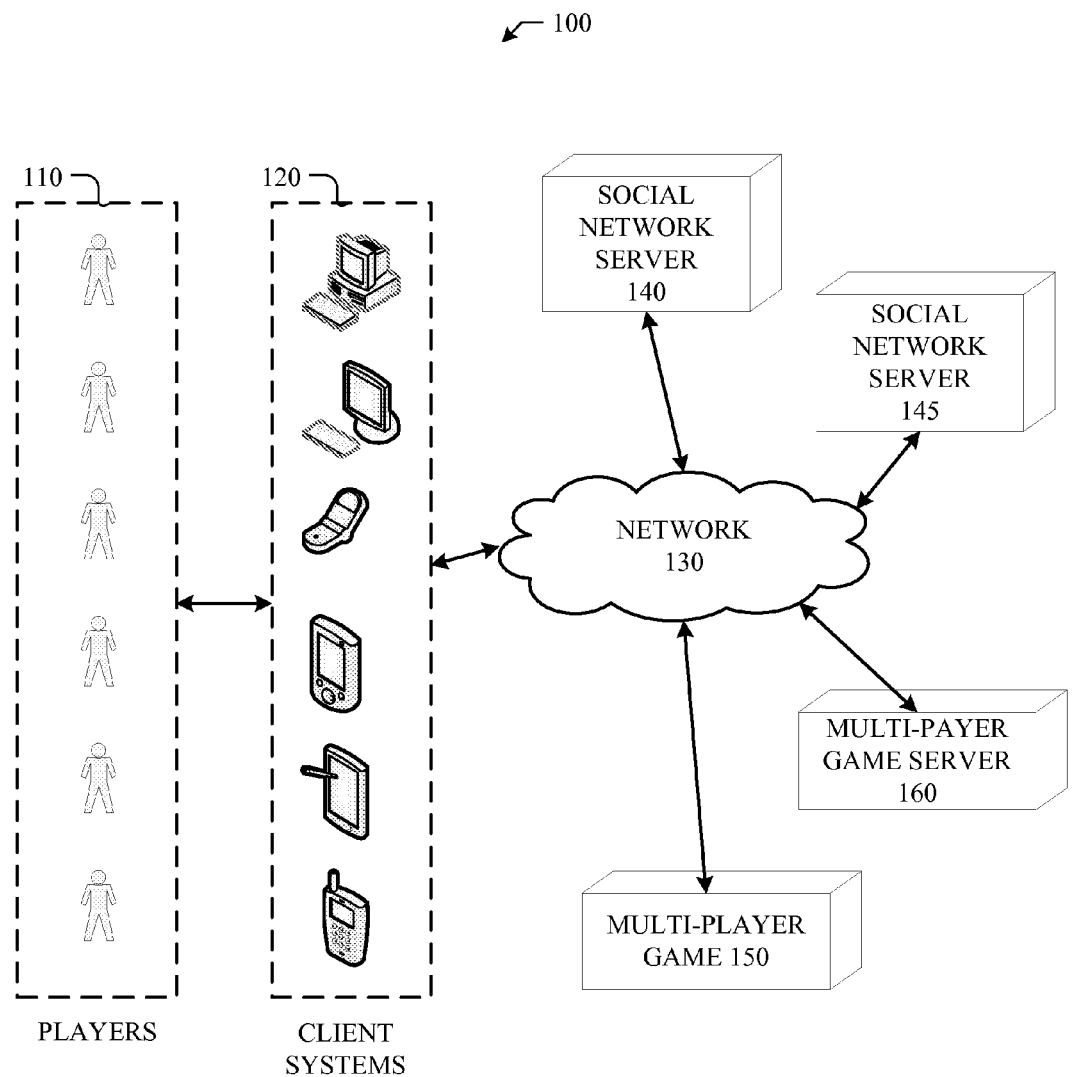
FIG. 1 illustrates a schematic of an example system that may be used to implement various embodiments of the present disclosure.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Computer-implemented games are a popular form of entertainment. Some games are desktop-based that may be run on individual computing devices as standalone applications. Some games are network-based. A network-based game typically includes one or more server components that may be run on a server system and one or more client components that may be run on a client device associated with a player of the game. In particular embodiments, a player of the network-based game may control the game's progress at the client device (e.g., by inputting commands to the game at the client device). The client components may be responsible for receiving inputs from the player, executing game logic, changing the state of one or more world or player state parameters, transmitting user inputs or other events to the server components running on the server system, receiving instructions from the server components, and displaying outputs of the game on the client device. The server components may provide backend support for the client components and may be responsible for maintaining application data of the game, processing the inputs from the player, updating and/or synchronizing the game state based on the game logic and each input from the player, and transmitting instructions to the client components. As a result, a network-based game may require its server and client components to communicate with each other frequently in order to coordinate their respective functionalities. For example, each time a player provides an input to the game through the client components at the client device (e.g., the player types on the keyboard or clicks the mouse of the client device), the client components of the game may need to transmit the player's input to the server components running on the server system. With some games, a player may provide many such inputs every second (e.g., the player of a war game continuously fires a weapon at his enemies by continuously clicking on the mouse of the client device, or a player of a harvest-mechanic game repeatedly clicks on objects to be harvested, etc.).

In one implementation described herein, an instance of a given game can be persistently stored as a set of game state parameters that characterize the state of various game objects, such as player character state parameters, non-player character parameters, and world state parameters. In one implementation, game state is maintained in a database as a serialized, unstructured string of text data as a so-called Binary Large Object (BLOB). When a player accesses a server to play a game, the BLOB containing the game state for the instance corresponding to the user is transmitted to a client device for use by a client-side executed object to process. In one implementation, the client-side executable may be a FLASH(r)-based game, which can de-serialize the game state data in the BLOB. As the user plays the game, the game logic implemented at the client maintain and modifies the various game state parameters locally. As discussed above, the client-side game logic may also batch game events, such as mouse clicks, and transmit these events to a remote server. The remote server may itself operate by retrieving a copy of the BLOB from a database or an intermediate memory cache (memcache) layer. The remote server can also de-serialize the BLOB to resolve the game state parameters and execute its own game logic based on the events in the batch file of events transmitted by the client to synchronize the game state on the server side. The remote server may then re-serialize the game state, now modified, into a BLOB and pass this to a memory cache layer for lazy updates to a persistent database.

With a client-server environment in which the network-based games may run, one server system may support multiple client devices. At any given time, there may be multiple players at multiple client devices all playing the same game. In practice, the number of players playing the same game at the same time may be very large. As the game progresses with each player, multiple players may provide different inputs to the game at their respective client devices, and multiple client devices may transmit multiple player inputs and/or game events to the server system for further processing at the same time. In addition, multiple client devices may transmit other types of application data to the server system. The performance of the server system may suffer as a result of receiving a great number of application data, including player inputs and game events, from a great number of client devices simultaneously.

In particular embodiments, to improve performance of the server system, especially a server system that supports multiple client devices concurrently, instead of having a client device sending a separate transmission to the server system each and every time an application datum is updated or an event is generated, the client components of a network-based game may accumulate the application data updates and the player inputs at the client device for a period of time. When there is a sufficient amount of application data updates and player inputs accumulated, the client device may transmit one message to the server system including all the accumulated application data updates and player inputs thus far. In particular embodiments, the application data updates and the player inputs may be accumulated into batch files at the client device so that each time the client device transmits a batch file to the server system, the batch file contains multiple application data updates and player inputs. In particular embodiments, the server system, which is operative to execute the game logic may then parse each batch file received from a client device into individual data updates and events and then update its own version of the game set by applying these events to the game logic. After the events in the batch have been processed, the synchronized game state data may be converted into a serialized binary objects or a serialized binary large object (BLOB) associated with a corresponding identifier. In particular embodiments, the server system may cache the application data of a game while the game is running on a client device and also store the application data in a database on a more permanent basis. In this case, each serialized BLOB corresponding to a particular game instance may then be sent to the memory cache and eventually be used to update the database. For example, in particular embodiments, the identifier may be sent to a synchronization (sync) server where it is entered into a sync queue. In particular embodiments, the sync server monitors the sync queue and processes the identifiers and the corresponding BLOBs from the memory cache to write the updated BLOBs to the database.

By collecting multiple game or player updates into update batch files at the client device, the client device may send a single batch file that includes many application event data updates to a server system, thus reducing the number of transmissions needed between the client device and the server system. As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time, either by a player of the game or by the game itself (e.g., based on the game logic). In particular embodiments, an application data update occurs when the value of a specific application datum is changed.

Various features of the present disclosure may be implemented with an example system 100 shown in FIG. 1. For instance, system 100 depicted in FIG. 1 may be used to facilitate or operate a multi-player game. In particular embodiments, multiple players 110 using corresponding client devices 120 may connect to and communicate via a network 130. Client devices 120 may be any device capable of connecting to network 130 such as, for example and without limitation, a personal computer, a smart phone, a mobile phone, a net book, a handheld gaming device, etc. Through network 130, client devices 120 may communicate with a first social network server 140, a second social network server 145, a first multi-player game server 150 and a second multi-player game server 160. In some embodiments, first and second social network servers 140 and 145 may include an internal multi-player game server. Similarly, multi-player game servers 150 or 160 may also include an internal social network server. In other embodiments, social network servers 140 and 145 and multi-player game servers 150 and 160 may communicate with one another over network 130. In particular embodiments, multi-player game servers 150 and 160 may each include a PHP (Hypertext Preprocessor) server. Each multi-player game server in system 100 may also include a game engine for any and all multi-player games hosted or operated thereon. Network 130 may be any appropriate electronics communication medium including, but not limited to, the Internet, a wireless network, or a closed proprietary network.

In various embodiments, multi-player game servers 150 and 160 may include computer readable code stored on a computer readable media configured to be executed on a processor in the multi-player game server to implement multi-player games including various features described herein. Multi-player game servers may load individual games from the computer readable medium in memory and then execute the games. It is possible for multi-player game servers 150 and 160 to run a plurality of multi-player games simultaneously. In particular embodiments, multi-player game servers 150 and 160 may also be configured to access social graphs for players 110 stored on social network servers 140 and 145. Information extracted from such social graphs (e.g., a player's social contacts) may be used incorporated in the game logic of specific games and may be used to determine the current state of a game. In some embodiments, multi-player game server 150 and multi-player game server 160 may be configured to access social graphs for players 110 stored on the each other.

Players 110 may use client devices 120 to access, send data to, and receive data from social network server 110 and multi-player game servers 150 and 160 over network 130. In some embodiments, client devices 120 may download and store game data from the various servers. Game data downloaded to client devices 120 may include information to enable various levels of off-line game play.

In particular embodiments, a computed-implemented game may be a text-based or turn-based game implemented as a series of web pages that are generated after a player selects one or more actions to perform. The web pages may be displayed in the web browsers executed on client devices 120. In one such implementation, a client application downloaded to client devices 120 may operate to serve a set of web pages to a user. In other implementations, a computer-implemented game may be an animated or rendered game executable as a stand-alone application or within the context of a web page or other structured document. In some implementations, the computer-implemented game may be implemented using Adobe Flash-based technologies. For example, a game may be fully or partially implemented as a SWF object that is embedded in a web page and executable by a Flash® media player plug-in. In various example embodiments, one or more described web pages may be associated with a networking system or networking service. However, alternative embodiments may have applications to the retrieval and rendering of structured documents hosted by any type of network addressable resource or web site. Additionally, as used herein, a "player" of the game may be an individual, a group, or an entity (such as a business or third party application).

Figure 2:
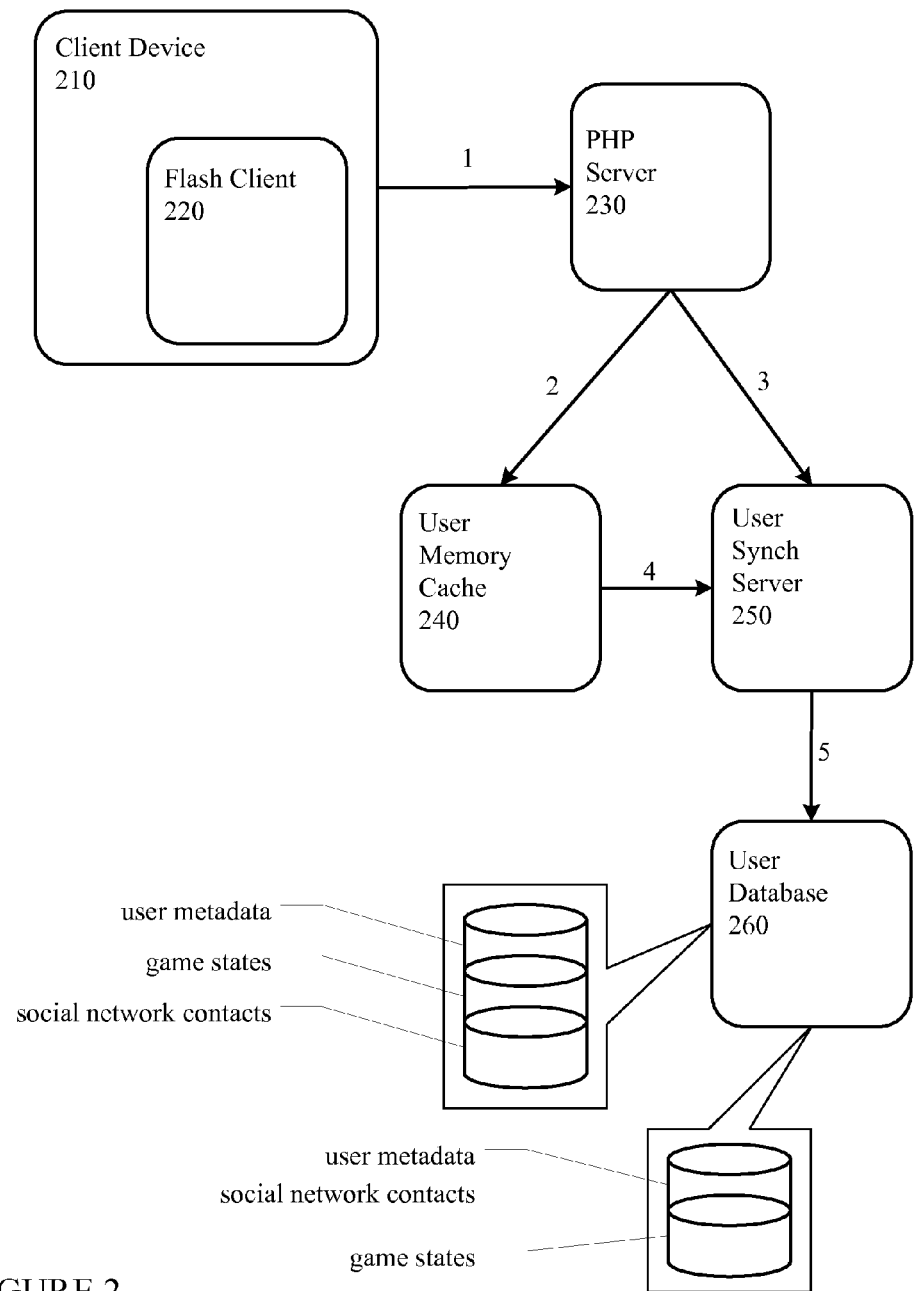
FIG. 2 illustrates an example system for processing remote Flash® object updates according to embodiments of the present disclosure.

FIG. 2 is a schematic of an example system for handling application event data updates to a remote server. As described above, the application event data of a game are any data relevant to the game (e.g., player inputs). In particular embodiments, each application datum may have a name and a value, and the value of the application datum may change (i.e., be updated) at any time. When an update to an application datum occurs at a client device, either caused by an action of a game player or by the game logic itself, the client device may need to inform a corresponding game server of the update. For example, if the game is a farming game with a harvest mechanic (such as Zynga Farmville™), an event can correspond to a user clicking on a parcel of land to harvest a crop. In such an instance, the application event data may identify an event or action (e.g., harvest) and an object in the game to which the event or action applies. For purposes of illustration only, the system shown in FIG. 2 will be discussed in reference to updating a multi-player online game hosted on a game server or social network server, where an instance of the game logic is executed remotely on a client device, which then transmits application event data to the remote game server such that the remote game server synchronizes game state associated with the instance executed by the client device.

In particular embodiment, one or more objects of a game may be represented as a Adobe Flash® object. Flash® is a multimedia platform originally acquired by Macromedia and currently developed and distributed by Adobe Systems. Since its introduction in 1996, Flash® has become a popular method for adding animation and interactivity to web pages. Flash® is commonly used to create animation, advertisements, and various web page components, to integrate video into web pages, and more recently, to develop rich Internet applications and games. Flash® may manipulate vector and raster graphics, and supports bidirectional streaming of audio and video. Several software products, systems and devices are able to create or display Flash® content, including Adobe Flash® Player®, which is available free for most common web browsers, some mobile phones and for other electronic devices (using Flash® Lite®). Adobe Flash®, or simply Flash®, refers to both a multimedia authoring program and the Adobe Flash® Player®. Strictly speaking, Adobe Flash® is the authoring environment and Flash® Player® is the virtual machine used to run the Flash® files, but in colloquial language, these have become mixed: "Flash®" may mean the authoring environment, the player or the application files.

In particular embodiments, client device 210 may include Flash® client 220. Flash® client 220 may be configured to receive and run Flash® application or game object code from any one or more of the servers shown in FIG. 1. In particular embodiments, Flash® client 220 may be run in a web browser executed on client device 210. A user (e.g., a game player) interacts with the Flash® objects using client device 210 and Flash® client 220. For example, the user may make various changes and updates to the Flash® object, such as moving an object within a virtual space, deleting an object, shooting an object, harvesting an object, and the like. Thus, when the user makes a change to a Flash object, the client-executed game logic may update one or more state parameters associated with the object. To ensure synchronization between the Flash® object shown to the user at the client device 210, the Flash® client 220 may send the events that caused the object state changes to the remote server. However, to expedite the processing and hence the speed of the overall gaming experience, the Flash® client 220 may collect a batch of some number of events or updates into a batch file. The number of events or updates may be determined by the Flash® client dynamically or determined by the remote server based on server loads or other factors. For example, client device 210 may send a batch file to the remote server whenever 100 updates have been collected or after a threshold period of time, such as every minute.

As described above, in particular embodiments, each application event datum may include an action or event name and a value (such as an object identifier). Thus, each application datum may be represented as a name-value pair in the batch file. The batch file may include a collection of name-value pairs representing the application data that have been updated at client device 210. In particular embodiments, the batch file may be a text file and the name-value pairs may be in string format.

When the batch file collects the requisite number of Flash® object updates (or a another threshold event occurs—such as the expiration of a timer), Flash® client 220 may send the batch file to a PHP server 230 in step 1. In particular embodiments, client device 210 may compress the batch file before transmitting it to the remote server, thus further reducing the size of the data that need to be transmitted from client device 210 and the remote server. In one implementation, the batch file includes an identifier or set of identifiers (such as a user identifier and game type identifier, or a game instance identifier, etc.) that uniquely identifies or maps to the instance of the game executed on the client device 210. Client device 210 and PHP server 230 may be connected by any suitable electronic medium such as the Internet, a wireless network, a proprietary network, etc. In particular embodiments, client device 210 and PHP server 230 may communicate using the HyperText Transfer Protocol (HTTP). The batch file may be sent from client device 210 to PHP server 230 as a HTTP message. PHP server 230 may receive the batch file and parse the batch file into its component events or updates. As each component update is parsed out of the batch file, the PHP server may retrieve the current game state parameters corresponding to the game instance, as discussed in more detail below, and process the updates, using the game logic, to synchronize the game state maintained on the back end with the game state at the client device 210. After the batch file for a given game instance has been processed, the PHP server 230 may also serialize the Flash® object updates into machine-readable string or object (e.g., a BLOB) that may include a unique identifier and the corresponding Flash® object update. In some embodiments, it may be desirable to have one or more elements of the machine-readable string or object be searchable in a database report. For this purpose, an extra tag or piece of metadata may be included in machine-readable string or object. The machine-readable string or object may be a serialized binary large object, otherwise known as a BLOB, which is a collection of binary data stored as a single entity in a database.

In particular embodiments, when a user plays a network-based game on a client device (e.g., client device 210) associated with the user, a server hosting the game (e.g., PHP server 230) may serialize all the game-related data, including, for example and without limitation, game states, game events, user inputs, for this particular user and this particular game into a BLOB and stores the BLOB in a database (e.g., user database 260) associated with the server. The BLOB may be associated with an identifier that indicates that the BLOB contains the serialized game-related data for this particular user and this particular game. In particular embodiments, while the user is not playing the game, the corresponding BLOB may be stored in the database. This enables the user to stop playing the game at any time without losing the current state of the game the user is in. When the user resumes playing the game next time, the server may retrieve the corresponding BLOB from the database to determine the most-recent values of the game-related data. In particular embodiments, while the user is playing the game, the server may also load the corresponding BLOB into a memory cache (e.g., user memory cache 240) so that the server may have faster access to the BLOB and the game-related data contained therein, thus improving the performance of the game, since accessing data stored in a memory cache (e.g., user memory cache 240) is much faster than accessing data stored in a database (e.g., user database 260).

The BLOB may comprise the identifier section, a body section and one or more tag sections. The identifier section may be encoded as an INT or other 4 kB object. The body section of the BLOB may be encoded in base64 or other 64 kB object. The one more tag sections may also be encoded as an INT or other 4 kB object.

Each time a batch file has been received at PHP server 230, PHP server 230 may process the batch file to extract the individual data updates. In particular embodiments, the PHP server 230 may retrieve the corresponding BLOB that contains the game-related information from user memory cache 240, de-serialize the BLOB to extract the individual game-related data, and apply the data updates to the specific game-related data to update their values. Then, PHP server 230 may re-serialized the game-related information, now having the updated data values, again into a BLOB and store the BLOB in user memory cache, as illustrated in step 2 of FIG. 2.

Updating user memory cache 240 is much faster and more practical than updating user database 260. At about the same time, PHP server 230 may send the corresponding unique identifier for each serialized BLOB to the user sync server 250. The user sync server 250 enters the unique identifiers into a user sync queue to await processing and updating user database 260 in step 3. In particular embodiments, updating the data stored in user database 260 may be performed in a lazy-update fashion (e.g., slower that updating the data stored in user memory cache 240). For example, in some implementation, the data stored in user database 260 may be updated once every 30 minutes. In some embodiments, user sync server 250 processes the user sync queue on a first-in-first-out (FIFO) basis. As each unique identifier makes it way through the queue waiting for its turn to be processed, the user memory cache 240 may or may not have been updated several times. To ensure continuity and consistency with the updates being made on Flash® client 220, unique identifiers in the serialized BLOB are processed in the same order as they are executed at the Flash® client 220.

When a unique identifier is processed by the user sync server 250, in particular embodiments, user sync server 250 retrieves the serialized BLOB corresponding to the unique identifier from user memory cache 240 in step 4 and then processes the appropriate updated to user database 250 in step 5. In one embodiment, user synch server 250 may replace the BLOB in user database 260 with the BLOB retrieved from user memory cache 240 and store the BLOB retrieved from user memory cache 240 in user database 260. Alternatively, in other embodiments, user synch server 250 may de-serialize both the BLOB stored in user database 260 and the BLOB retrieved from user memory cache 240, update the game-related data in user database 260 using the game-related data contained in the BLOB retrieved from user memory cache 240, re-serialize the updated game-related data in user database 260 into a BLOB, and store the re-serialized BLOB back into user database 260. In such embodiments, user database 260 may be slightly out of sync with user memory cache 240. However, user memory cache 240 may be updated quickly enough using the serialized BLOBs provided by PHP server 230 to provide a game environment that may appear identical to a user at client device 210 using Flash® client 220 and other users at other locations.

Figure 3A:
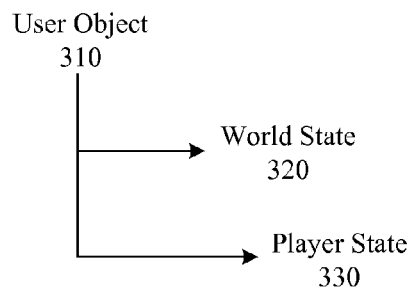
FIGS. 3A-3C illustrate various data structures according to embodiments of the present disclosure.
Figure 3B:
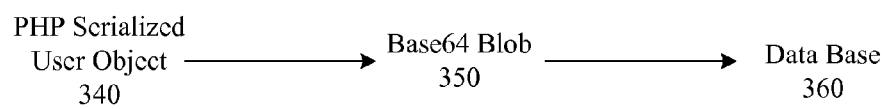
Figure 3C:
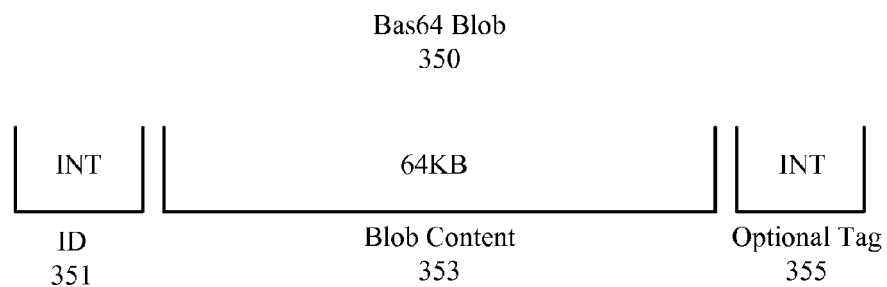

FIGS. 3A-3C show various aspects and structures of game updates, user objects, and serialized BLOBs according to various embodiments of the present disclosure. FIG. 3A shows a user object 310 that may include a world state 320 and the player state 330 as they relate to a particular game. The world state 320 may include changes to the conditions of the game including level ups, change of mission, etc. The player state 330 may include changes to the player character including level, experience, damage, appearance, etc. User object 310 may be updated on the client device 210 using a Flash® client 220 with the change stored in an update file waiting to be collected into a batch to be sent to a PHP server 230. User object 310 may be changed multiple times before the batch file is sent to the PHP server 230. Such successive changes may be realized when each of the update files are processed in sequence by the PHP server 230 and the user sync server 250.

FIG. 3B shows the data flow of updating the database 260 according to various embodiments of the present disclosure. First, the PHP server 230 may create a PHP serialized user object 340. The serialized version of the user object 310 may be a long single dimension data structure that may be converted into a suitable machine language or machine-readable code. In this example, the PHP serialized user object 340 is converted into a base64 BLOB 350. As previously mentioned, the base64 BLOB 350 may include an identifier section and, optionally, a searchable tag section. Once base64 BLOB 350 is created, it may be used to update a memory cache 350 or a database 360 or both.

FIG. 3C shows the sections of the base64 BLOB 350. Base64 BLOB 350 may include an ID section 351, BLOB content section 353 and optional tag section 355. The ID section 351 may be encoded as an integer or a 4 kB binary number. The ID section 351 may be used to correlate base64 BLOB 350 to the original update file that the PHP server used to create the BLOB. The ID section 351 is important for later recall of the BLOB from memory cache to update the database 260. The BLOB content section 353 may include a 64 kb of update information for user object 310 or any game or application state update. The BLOB content 353 may be encoded into any suitable machine-readable code. The optional tag section 355 may be encoded in a similar fashion as the ID section 351.

Figure 4:
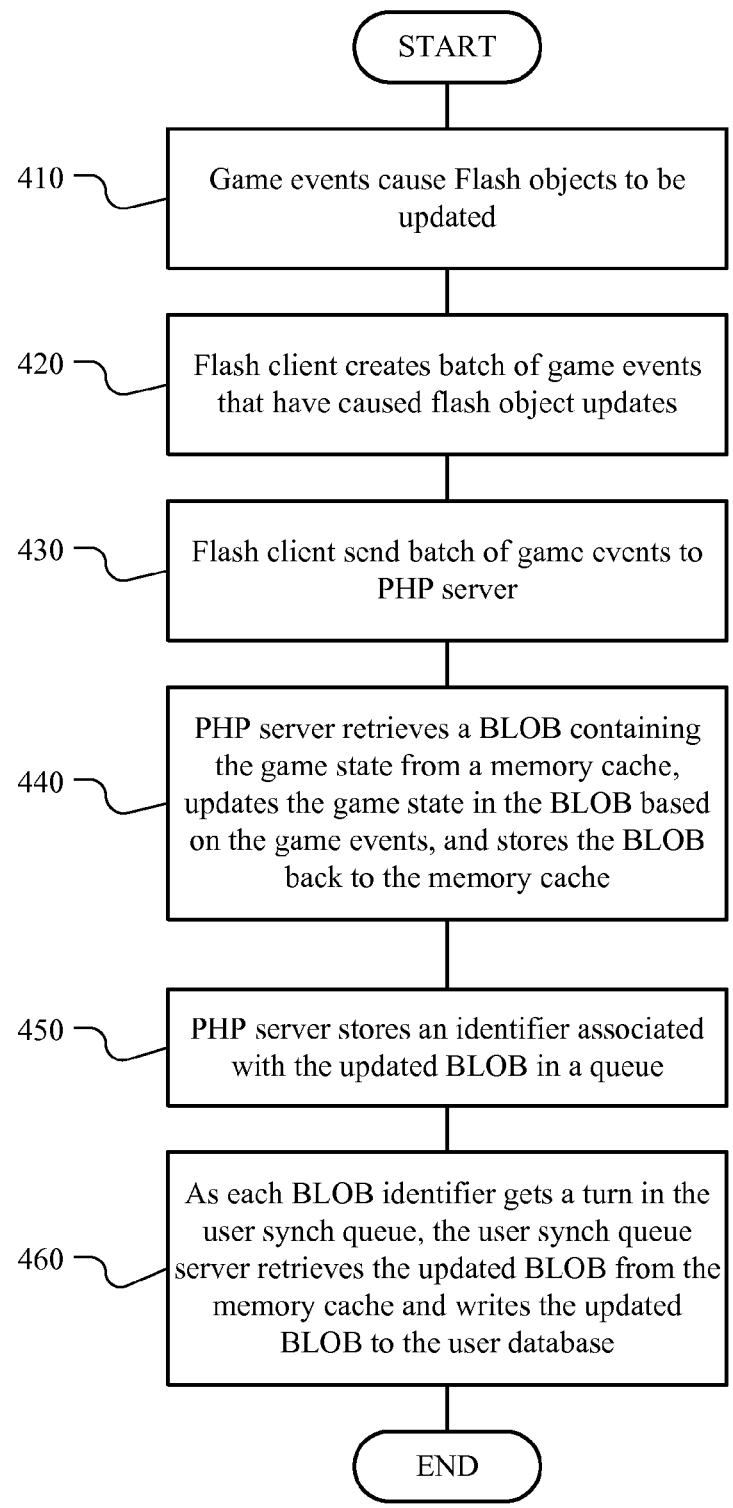
FIG. 4 illustrates an example method for updating remote Flash® objects according to embodiments of the present disclosure.

FIG. 4 is a flowchart of a method for updating a remote server according to various embodiments of the present disclosure. As described above, in particular embodiments, a network-based computer-implemented game may includes a number of server components and a number of client components. While a user plays the game, the server components may be executed on a server hosing the game and the client components may be executed on a client associated with the user. The user may interact with the game via the client components. While the user plays the game, the server components and the client components may exchange game-related data from time to time over, for example, a computer network. In addition, application data of the game specifically associated with this particular user may be serialized into a BLOB and stored in a database associated with the server. The BLOB may be assigned a unique identifier (e.g., an identifier that identifies with which user and which game the game-related data contained in the BLOB are associated) to distinguish one BLOB associated with one user and one game with another BLOB associated with another user or another game. While the user plays the game, the game-related data associated with the user may be loaded into a memory cache associated with the server.

In particular embodiments, the application data of the game may include a number of objects representing various aspects of the game, including player characters, non-player characters, in-game assets, and the like. The user interacts with the game by providing user inputs (e.g., mouse clicks, keyboard typing, joy stick movements) through the client components executing on the client associated with the user. In response to each user input, the game logic may change the game-state accordingly. In general, each user input, game-state change, or other type of game-related action may be referred to as a game event. In particular embodiments, each game event may cause one or more application data of the game (e.g., one or more objects of the game) to be updated. At step 410, a game event (e.g., a user input) may cause an object in a Flash® client to be updated using a client device. Multiple game events may cause multiple objects to be updated or an object to be updated multiple times. For example, the user may repeatedly generate game events by repeatedly clicking on a mouse. In particular embodiments, the Flash® client may collect these game events that cause the game objects to be updated. At step 420, the Flash® client may create a batch of game events that have caused the Flash® objects to be updated at the client device and compile them in a batch file. Once the batch file has reached a sufficient size (e.g., a threshold number of game events) or predetermined amount of time has passed, the Flash® client may send the batch file of the game events to a PHP server in step 430. In some embodiments, the PHP server may be included in a game server, a social networking server or may be configured as a standalone separate server.

Since the game is currently running, in particular embodiments, the BLOB containing the game-related data associated with this particular user and this particular game has been loaded into a memory cache. At step 440, the PHP server retrieves the BLOB containing the game-related data associated with this particular user and this particular game from the memory cache (e.g., using the identifier assigned to the BLOB), de-serializes the BLOB by parsing the data, and updates the game-related data contained in the BLOB using the game events contained in the batch file received from the Flash® client. In particular embodiments, the PHP server may parse the batch file to extract the individual game events, and de-serialize the BLOB to extract the state parameters of the objects that represent the game-related data. Since the game events causes specific objects to be updated according to the game logic of the game, the PHP server may similarly update the game objects extracted from the BLOB by applying the game logic to each game event extracted from the batch file. Once all the game events in the batch file have been processed and all the game objects have been updated based on the game events and the game logic, the PHP server may re-serialize all the game objects back into a BLOB and store the BLOB back to the memory cache. In particular embodiments, the re-serialized BLOB may have the same identifier as the original BLOB.

Either in a parallel or serial manner, PHP server may also send the unique BLOB identifier to the user sync queue hosted and monitored on the user sync server in step 450. The unique BLOB identifiers may be stored in a queue and may be processed in a FIFO manner such that the updates to the memory cache or the database are processed in the same order in which the user makes the changes at the client device.

At step 460, each unique BLOB identifier may make its way through the user sync queue and the user sync server may retrieve the BLOB identified by the BLOB identifier, which now contains the updated game objects, from the memory cache and writes the updated BLOB corresponding to the unique BLOB identifier to a user database. In some embodiments, the entire BLOB retrieved from the memory cache may be stored in the user database as a single object. In other embodiments, the synch server may de-serialize the BLOB retrieved from the memory cache to extract the individual game objects and store these game objects in the user database.

In particular embodiments, because the application data of a game may include different types of data (e.g., player metadata, player social network contacts, game states, etc.), user database 260 may be partitioned into multiple parts where each part is used to store one or more specific types of the game application data. For example, in one implementation, user database 260 may be partitioned into three parts for storing user metadata, game states, and social network contacts respectively. In another implementation, user database 260 may be partitioned into two parts, where user metadata and social network contacts are stored in one part and game states are stored in another part. While a game is running, some types of its application data may be updated more frequently than other types of application data. By storing different types of application data in different parts of user database 260, accessing those types of data that are frequently updated may be performed more efficiently.

In one such implementation, the data stored in connection with a game instance corresponding to the user can be stored as two or more separate BLOBs. For example, in one implementation, a first BLOB type stores meta data of a user; a second BLOB type stores game state data of the game instance associated with the user, and a third blob type stores the social network contacts of the user. In an alternative implementation involving only two BLOB types, a first BLOB type stores meta data and social network contacts of the user; and a second BLOB type stores game state data of the game instance associated with the user. Partitioning of the game data in this manner achieves certain efficiencies. For example, in a social network game, retrieving the data for a given instance of a game associated with a first user often involves retrieving meta data (such as user names and profile pictures) of one or more in-game contacts or friends of the user. By partitioning the data as described above, the user of smaller BLOBs for more frequently accessed data, such as user meta data reduces memory and back-end bandwidth requirements—thereby improving the efficiency and costs of maintaining the system. In one implementation, each BLOB can be identified by a tuple including one or more of a game identifier, a user identifier and a blob type identifier. These identifiers may be concatenated and, optionally, hashed to generate a unique identifier for the BLOB.

Figure 5:
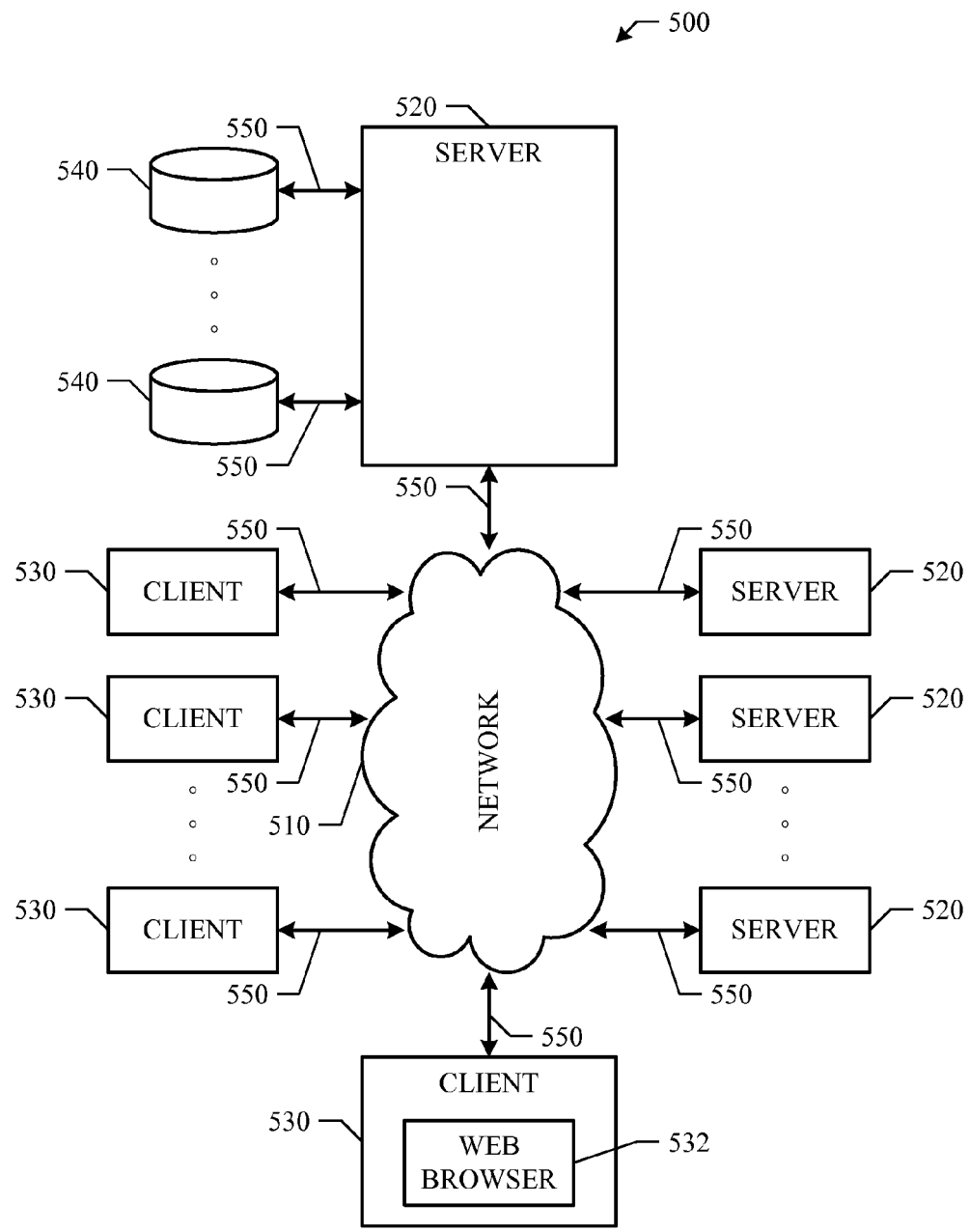
FIG. 5 illustrates an example network environment.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVA-SCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
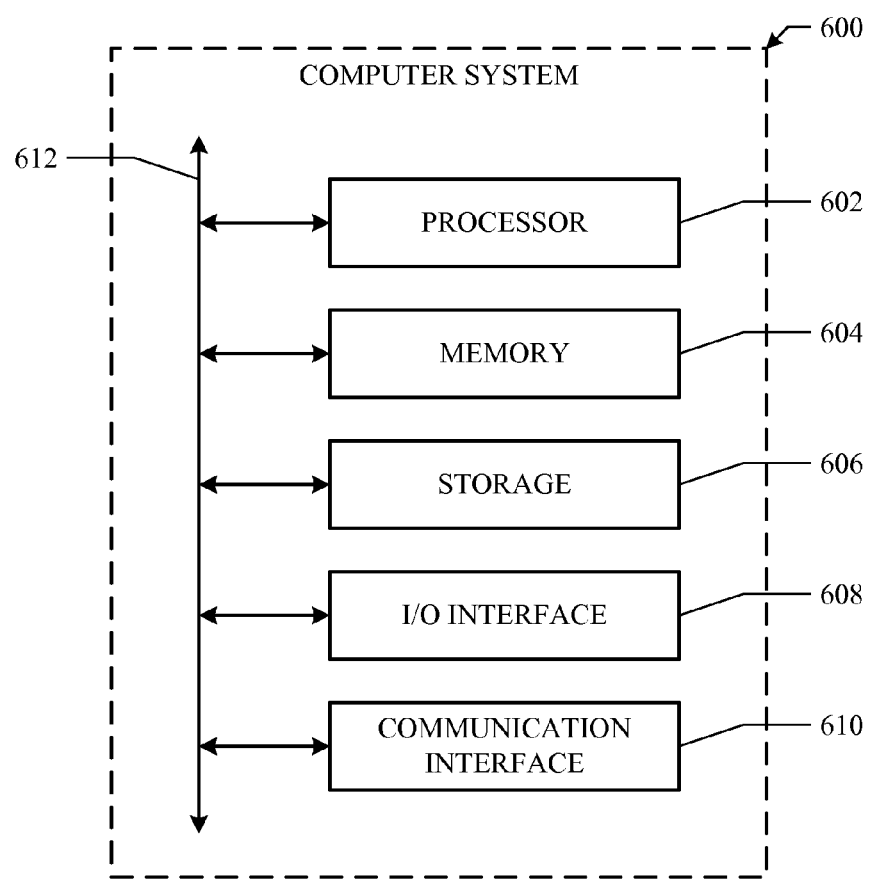
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
    accessing, using a computing device, a batch file transmitted after a threshold period of time by a remote game application executing an instance of a computer-implemented game, wherein the batch file includes a plurality of events generated by the remote game client application;
    accessing, in response to the batch file, a game state data object associated with the instance of the computer-implemented game, wherein the game state data object is a Binary Large Object (BLOB) and includes one or more game state parameters formatted as serialized unstructured data;
    parsing the game state data object to identify the one or more game state parameters;
    processing the plurality of events in the batch file against game logic to update one or more of the game state parameters;
    re-serializing the one or more game state parameters into an updated game state data object; and
    storing the game state data object in a memory cache for subsequent asynchronous processing to update a database that persistently stores the game state data object as a BLOB.

2. The method recited in claim 1, further comprising:
    assigning a unique identifier to the updated game state data object;
    storing the unique identifiers in a queue associated with a database;
    asynchronously processing each of the identifiers in the queue to update data stored in the database, wherein processing one of the identifiers comprises:
        retrieving the updated game state data object identified by the identifier from the memory cache; and
        storing the updated game state data object in the database.

3. The method recited in claim 2, wherein:
    the database is partitioned into a plurality of sections;
    the data stored in the database are divided into a plurality of groups; and each of the sections of the database is used to store one or more of the groups of data.

4. The method recited in claim 1, wherein:
    the batch file is compressed; and
    parsing the batch file comprises uncompressing the batch file.

5. A system, comprising:
    a memory comprising instructions executable by one or more processors; and
    one or more processors coupled to the memory and operable to execute the instructions, the one or more processors being operable when executing the instructions to:
        access a batch file transmitted after a threshold period of time by a remote game application executing an instance of a computer-implemented game, wherein the batch file includes a plurality of events generated by the remote game client application;
        access, in response to the batch file, a game state data object associated with the instance of the computer-implemented game, wherein the game state data object is a Binary Large Object (BLOB) and includes one or more game state parameters formatted as serialized unstructured data;
        parse the game state data object to identify the one or more game state parameters;
        process the plurality of events in the batch file against game logic to update one or more of the game state parameters;
        re-serialize the one or more game state parameters into an updated game state data object; and
        store the game state data object in a memory cache for subsequent asynchronous processing to update a database that persistently stores the game state data object as a BLOB.

6. The system of claim 5, further comprising instructions operable to, when executed, cause the one or more processors to:
    assign a unique identifier to the updated game state data object;
    store the unique identifiers in a queue associated with a database;
    asynchronously process each of the identifiers in the queue to update data stored in the database, wherein processing one of the identifiers comprises:
    retrieve the updated game state data object identified by the identifier from the memory cache; and
    store the updated game state data object in the database.

7. The system of claim 6, wherein:
    the database is partitioned into a plurality of sections;
    the data stored in the database are divided into a plurality of groups; and
    each of the sections of the database is used to store one or more of the groups of data.

8. The system of claim 5, wherein:
    the batch file is compressed; and
    parsing the batch file comprises uncompressing the batch file.

9. One or more computer-readable storage media, which are non-transitory, embodying software operable when executed by one or more computing devices to:
    access a batch file transmitted after a threshold period of time by a remote game application executing an instance of a computer-implemented game, wherein the batch file includes a plurality of events generated by the remote game client application;
    access, in response to the batch file, a game state data object associated with the instance of the computer-implemented game, wherein the game state data object is a Binary Large Object (BLOB) and includes one or more game state parameters formatted as serialized unstructured data;
    parse the game state data object to identify the one or more game state parameters;
    process the plurality of events in the batch file against game logic to update one or more of the game state parameters;

re-serialize the one or more game state parameters into an updated game state data object; and store the game state data object in a memory cache for subsequent asynchronous processing to update a database that persistently stores the game state data object as a BLOB.

10. The media of claim 9, further comprising software operable when executed by the one or more computing devices to:

assign a unique identifier to the updated game state data object;

store the unique identifiers in a queue associated with a database;

asynchronously process each of the identifiers in the queue to update data stored in the database, wherein processing one of the identifiers comprises:

retrieve the updated game state data object identified by the identifier from the memory cache; and store the updated game state data object in the database.

11. The media of claim 10, wherein:

the database is partitioned into a plurality of sections;

the data stored in the database are divided into a plurality of groups; and each of the sections of the database is used to store one or more of the groups of data.

12. The media of claim 9, wherein:

the batch file is compressed; and parsing the batch file comprises uncompressing the batch file.

* * * * *

UNITED STATES PATENT AND TRADEMARK OFFICE
CERTIFICATE OF CORRECTION

PATENT NO.        : 8,290,920 B2
APPLICATION NO.   : 12/878904
DATED             : October 16, 2012
INVENTOR(S)       : Amitt Mahajan et al.

It is certified that error appears in the above-identified patent and that said Letters Patent is hereby corrected as shown below:

In the drawings:
Label 160 in Figure 1: change from "MULTI-PAYER GAME SERVER 160" to "MULTI-PLAYER GAME SERVER 160".

Signed and Sealed this
Thirteenth Day of November, 2012

David J. Kappos
*Director of the United States Patent and Trademark Office*